United States Patent [19]

Banerian

[11] 4,445,264
[45] May 1, 1984

[54] TOOL FOR A METHOD OF FORMING DIMPLES IN SHEET METAL FOR RECESSING RIVET HEADS

[76] Inventor: Carl Banerian, 25110 W. Chicago, Redford, Mich. 48239

[21] Appl. No.: 356,357

[22] Filed: Mar. 9, 1982

[51] Int. Cl.³ .............................................. B23P 9/00
[52] U.S. Cl. ..................... 29/445; 29/526 R; 72/70; 72/115; 72/454; 72/463; 408/241 B
[58] Field of Search .............. 72/70, 324, 112, 334, 72/115, 338, 125, 463, 414, 340, 454; 408/72 B, 241 B; 269/249, 87.3; 29/445, 526 R, 526 A, 464, 522 R, 522 A

[56] References Cited

U.S. PATENT DOCUMENTS

| | | | |
|---|---|---|---|
| 2,245,933 | 6/1941 | Moore | 29/526 A |
| 2,292,446 | 8/1942 | Huck | 72/340 |
| 2,432,804 | 12/1947 | Rieske | 72/414 |
| 2,928,450 | 3/1960 | Belding | 72/358 |
| 3,980,287 | 9/1976 | Nilsson | 72/454 |
| 4,158,955 | 6/1979 | Bustin | 269/87.3 |

Primary Examiner—Lowell A. Larson
Attorney, Agent, or Firm—A. W. Breiner

[57] ABSTRACT

This invention relates to the joining of two metal sheets such as in the repair of automobile body components. There is provided a tool which may be utilized to first form a dimple in one or more sheets, and then form a bore through the one or more sheets in alignment with the dimple so that the head of the fastener utilized to join the sheets may be recessed within the dimple and covered by a suitable filler material to provide a flush surface. The tool and the method of utilizing the same are particularly adaptable for securing together sheets utilizing conventional pop rivets.

7 Claims, 6 Drawing Figures

TOOL FOR A METHOD OF FORMING DIMPLES IN SHEET METAL FOR RECESSING RIVET HEADS

This invention relates in general to new and useful improvements in tools for utilization of rivets, particularly pop rivets; and more particularly to a tool for dimpling sheet metal and for forming through such dimpled sheet metal a rivet or like fastener receiving bore in centered relation with respect to the formed dimple.

A typical application of the invention relates to the repair of automobile bodies. When automobile body components are rusted out or even when the metal has been torn away in a wreck, it is necessary to provide the damaged portion of the automobile body with a backing so that the body component will have the necessary strength and the backing, at the same time, providing a suitable backing surface for the usual body filler. It is customary to merely drill holes through the aligned existing sheet metal and the backing material, and then to join the backing material to the original sheet metal utilizing pop rivets. However, the heads of the pop rivets protrude and this requires an undue build-up of the body filler. This is both expensive and also results in a change in the contour of the body component.

In accordance with this invention it is proposed to provide the sheet metal of a vehicle body or any other sheet metal to which another sheet metal member is to be joined with a dimple which is deep enough to fully receive in recessed relation the head of a pop rivet or any other similar fastener; and then, after the dimple has been formed, utilizing the same fixture to effect the drilling of a hole or bore through the sheet metal in centered relation with respect to the dimple.

In accordance with this invention there is provided a very simple tool. This tool includes a generally C-shaped member of which the bottom leg is in the form of a workpiece support and the top leg is in the form of a carrier for a forming member. The carrier is provided with a threaded bore into which a hardened bolt may be readily threaded. The lower end of the bolt is provided with the desired dimple-forming configuration, and the head of the bolt is exposed above the carrier so that it may be readily rotated utilizing conventional wrenches.

Further in accordance with this invention, the workpiece support is provided with a recessed seat which cooperates with the forming member so as to form a dimple of the desired depth for completely receiving the head of the pop rivet or like fastener which is to be utilized.

The tool is provided with another most advantageous feature. The forming member is provided with an axial bore therethrough which is in the form of a pilot hole for a drill. A similar bore is formed in the workpiece support in alignment with the seat formed therein so that after the dimple has been formed in the sheet metal, while the sheet metal is still clamped in place, a drill is run down through the forming member and a hole is bored through the sheet metal in alignment with the dimple. In this manner the head of the pop rivet or like fastener is automatically centered with respect to the dimple so that the head of the pop rivet or like fastener is centered within the dimple. Since the fastener head is fully recessed, it is merely necessary to fill the dimple surrounding the fastener head so as to provide a smooth surface in the sheet metal receiving the rivet.

Having described the invention in general terms, specific and presently preferred embodiments will be set forth in the context of the illustrative drawing.

Figure 3A:
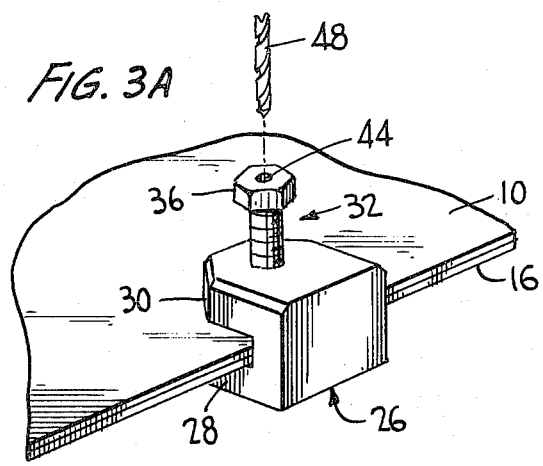
FIG. 3A is a perspective view of the tool of FIG. 1 showing the same forming simultaneous dimples in overlap metal sheets, and a drill bit being positioned to bore a hole centered with respect to the dimples.
Figure 3B:
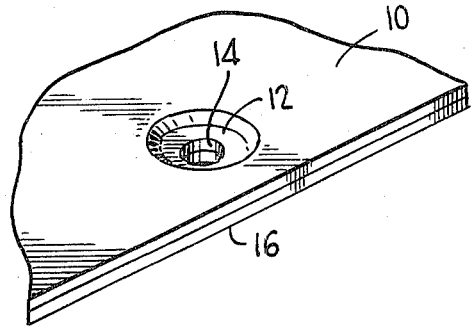
FIG. 3B is an enlarged fragmentary perspective view showing the dimpled overlap sheets.
Figure 3C:
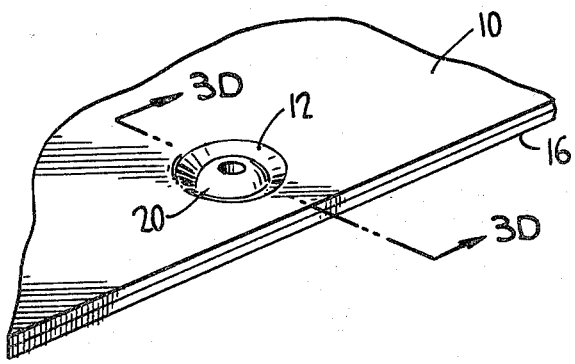
FIG. 3C is another fragmentary perspective view similar to FIG. 3B, but with the metal sheets joined together by a pop rivet.
Figure 3D:
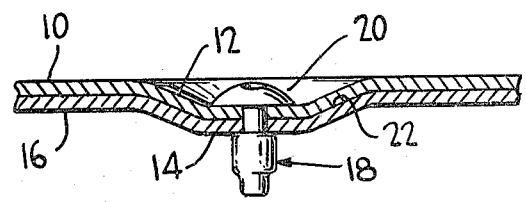
FIG. 3D is a sectional view taken along line 3D—3D of FIG. 3C, and shows the assembled sheets.

In accordance with this invention it is proposed to join two sheets of metal, such as the metal sheet 10 of FIG. 3D, and another sheet. The sheet 10, being the outer sheet and normally being the base material which is being repaired, is provided with a dimple 12. A bore 14 is formed centrally of the dimple 12, and the sheet 10 is joined to the second sheet 16 by means of a conventional pop rivet 18. The pop rivet 18 is provided with a head 20 which is seated within the recess of the dimple 12 and is centered with respect to the dimple 12.

With the pop rivet being so seated within the dimple 12, the filler material which is utilized in the repair work may also be used to fill the recess 12 around and over the rivet head 20 so as to provide for a smooth outer surface on the sheet 10.

In the illustrated embodiment of the invention, the sheet 16 is flush with the rear surface of the sheet 10, and thus has a similar dimple 22 formed therein. It is preferred that the dimples 12 and 22 be simultaneously formed so that they will be complementary and interlock as is shown in FIG. 3B.

In order to form the dimple 12 and also the dimple 22, if desired, there is provided a tool formed in accordance with this invention, the tool being generally identified by the numeral 24. The tool 24 includes a generally C-shaped fixture 26 which has a lower leg 28 and a spaced upper leg 30 fixedly joined together by a vertical web 31. Thus, there is a gap 33 between the legs 28 and 30 into which one or more sheets of metal may be inserted for having a dimple formed therein.

It is to be understood that for future reference the bottom leg 28 may be considered to be a workpiece support, and the upper leg 30 may be considered as a carrier for a dimple-forming member.

Figure 1:
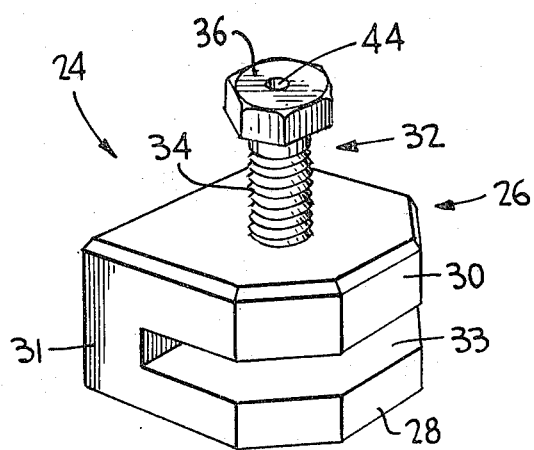
FIG. 1 is a perspective view of the tool which is the subject of this invention and shows the general details thereof.
Figure 2:
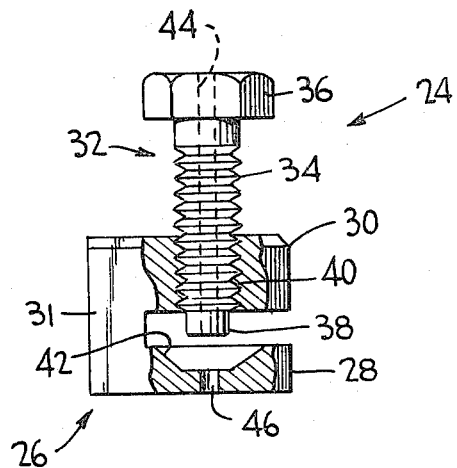
FIG. 2 is a side elevational view of the tool of FIG. 1 with portions broken away as shown in section to illustrate the contructional details of the tool.

In accordance with this invention, the dimple-forming member, generally identified by the numeral 32, is in the form of a hardened bolt having a threaded shank 34 and an integral head 36. As is best shown in FIG. 2, the free end of the shank 34 is machined to define a dimple-forming surface 38.

The upper leg or carrier 30 is provided with an internally threaded bore 40 through which the shank 34 of the bolt 32 is threaded. Also, as shown in FIG. 2, the workpiece support or lower leg 28 is provided with a dimple-forming seat 42 which is aligned with the threaded bore 40 and is of a shape to cooperate with the dimple-forming surface 38 to form the dimple 12 or the dimple 22.

In order that a bore, such as the bore 14, may be formed through the sheet metal material in alignment with the dimple, the bolt 32 is provided with an axial bore 44. A like bore 46 is formed through the lower leg 28 in centered relation with respect to a dimple 42 and in alignment with the bore 44.

It is to be understood that the bore 44 constitutes a pilot for a drill, such as the drill 48 of FIG. 3A, so that the bore 14 of the required size may be formed.

In accordance with this invention the fixture 26 is placed over one or more sheets, the sheets 10 and 16 being illustrated in FIG. 3A; and then the bolt 32 is rotated so that it first grips the sheets and clamps the sheets against the lower leg 28. Further rotation of the bolt 32 will result in the deformation of the one or more metal sheets to form either a single dimple 12 in the case of a single sheet, or telescope dimples 12 and 22 in the case of aligned sheets.

The required dimple or dimples having been formed with the tool 24 still being in its dimple-forming position, a drill 48 is passed down through the bore 44 and is rotated to bore a hole through the sheet or sheets in centered relation to the formed dimple or dimples. After the drill 48 has been removed, the bolt 32 is turned in the reverse direction and the sheet or sheets are released. The sheets may then be assembled utilizing a pop rivet in the manner shown in FIGS. 3C and 3D.

Although specific reference is made herein to pop rivets inasmuch as they are the most conventional fastener for securing together metal sheets, it is to be understood that the same dimple arrangement can be utilized in conjunction with conventional rivets or even-headed fasteners such as small bolts.

Although only a preferred embodiment of the invention has been specifically illustrated and described herein, it is to be understood that minor variations may be made in the tool and the method of utilizing the same without departing from the spirit and scope of the invention as defined by the appended claims.

It is claimed:

1. A hand-operated device for forming a dimple in a workpiece to permit recessing of a head of a fastener and for permitting in a continuing operation the drilling of a hole centered in the formed dimple, said device comprising a forming member which is externally threaded having a dimple-forming end, mounting means mounting said forming member for axial movement, said mounting means including a workpiece support and a carrier for said forming member, and said workpiece support including a recessed seat aligned with said forming member for cooperation with said forming member to dimple said workpiece; and said forming member having a drill pilot bore extending axially therethrough whereby after a dimple has been formed in a workpiece a fastener receiving bore centered relative to the dimple may be drilled through the workpiece.

2. A device according to claim 1 wherein said carrier includes a nut portion cooperatively receiving said forming member for effecting axial movement of said forming member upon rotation of said forming member.

3. A device according to claim 2 wherein said forming member is in the form of a bolt.

4. A device according to claim 1 wherein said workpiece support and said carrier are fixedly joined and define lower and upper legs of a C-shaped member.

5. A method of preparing sheet metal for recessing a rivet and like fastener, said method comprising the steps of seating the sheet metal on a workpiece support, forcibly engaging the metal with an axially movable forming member to form a dimple, and then passing a drill axially through the forming member and drilling the sheet metal to form a fastener receiving bore through the sheet metal in alignment with the dimple.

6. A method according to claim 5 wherein another sheet or like element is secured to the sheet metal by passing a headed fastener through the base in the sheet metal with the fastener head being recessed within the dimple and the fastener also extending though the element, and then securing the fastener in place.

7. A method according to claim 6 wherein the element is a second metal sheet, and the two sheets are aligned when the dimple is formed so as to provide the two sheets with interlocking dimples.

* * * * *